(12) United States Patent
Klotz et al.

(10) Patent No.: US 8,326,512 B2
(45) Date of Patent: Dec. 4, 2012

(54) DEVICE FOR LONGITUDINALLY GUIDING A MOTOR VEHICLE HAVING A NAVIGATION SYSTEM

(75) Inventors: Albrecht Klotz, Aichtal (DE); Dieter Hoetzer, Farmington Hills, MI (US); Markus Hagemann, Stuttgart (DE); Brendan Gibson, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 748 days.

(21) Appl. No.: 11/991,327

(22) PCT Filed: Jul. 24, 2006

(86) PCT No.: PCT/EP2006/064570
§ 371 (c)(1),
(2), (4) Date: Sep. 17, 2009

(87) PCT Pub. No.: WO2007/025807
PCT Pub. Date: Mar. 8, 2007

(65) Prior Publication Data
US 2010/0004840 A1 Jan. 7, 2010

(30) Foreign Application Priority Data

Aug. 29, 2005 (DE) .......................... 10 2005 040 776

(51) Int. Cl.
*B60K 31/00* (2006.01)
(52) U.S. Cl. ............................ 701/96; 701/409; 701/519
(58) Field of Classification Search .................. None
See application file for complete search history.

(56) References Cited

U.S. PATENT DOCUMENTS

| 6,116,369 A * | 9/2000 | King et al. ..................... 180/169 |
| 6,600,986 B2 * | 7/2003 | Steinle et al. ..................... 701/70 |
| 2004/0061626 A1 * | 4/2004 | Kubota ......................... 340/901 |

FOREIGN PATENT DOCUMENTS

| DE | 198 21 803 | 11/1999 |
| DE | 199 31 161 | 1/2001 |
| EP | 0 956 993 | 11/1999 |
| JP | 8-263791 | 10/1996 |
| JP | 2000 20899 | 1/2000 |
| JP | 2001-312798 | 11/2001 |
| JP | 2004-86450 | 3/2004 |
| JP | 2004 86450 | 3/2004 |
| JP | 2005 96675 | 4/2005 |
| JP | 2005 128762 | 6/2005 |

\* cited by examiner

*Primary Examiner* — Michael J. Zanelli
(74) *Attorney, Agent, or Firm* — Kenyon & Kenyon LLP

(57) ABSTRACT

A device for longitudinally guiding a motor vehicle includes a sensor system for locating preceding vehicles, a regulator that regulates the speed of the vehicle to a setpoint speed, either in a free driving mode or in a following driving mode, the setpoint speed depending on the distance from a preceding vehicle, as well as an interface to a navigation system that provides information concerning the route traveled, and a limiting device for limiting the setpoint speed based on the information provided. The limiting device is designed to deactivate automatically when changing from free driving mode to following driving mode and activate automatically when changing from following driving mode to free driving mode.

7 Claims, 3 Drawing Sheets

DEVICE FOR LONGITUDINALLY GUIDING A MOTOR VEHICLE HAVING A NAVIGATION SYSTEM

FIELD OF THE INVENTION

The present invention relates to a device for longitudinally guiding a motor vehicle, including a sensor system for locating preceding vehicles, a regulator that regulates the speed of the vehicle to a setpoint speed, either in a free driving mode or in a following driving mode, the setpoint speed depending on the distance from a preceding vehicle, as well as an interface to a navigation system that provides information concerning the route traveled, and a limiting device for limiting the setpoint speed based on the information provided.

BACKGROUND INFORMATION

Such devices for longitudinally guiding a motor vehicle are also known as ACC (adaptive cruise control) systems and typically have a radar sensor as a sensor system which can be used to measure the distances and relative speeds of preceding vehicles. This method makes it possible to follow a vehicle traveling directly ahead, the so-called target object, at a suitable distance or, more precisely, in a suitably selected time interval. In free driving mode when no target object is present, the speed is regulated to a setpoint speed, which in the systems in use today is specified by a desired speed selected by the driver.

In specific conditions, for example when driving in tight curves, it is possible that the regulation may not be adapted to the current situation so that the curve is taken at an excessively high speed. The driver is then forced to intervene in the longitudinal guidance and temporarily deactivate the ACC system.

In German Patent Application Nos. DE 198 21 803 and DE 199 31 161, longitudinal guidance systems are described having a connection to a navigation system which is also present in the vehicle so that the route information supplied by the navigation system, in particular the information readable from a digital map concerning the curvature of the section of roadway directly ahead, can be included in the speed regulation.

SUMMARY OF THE INVENTION

In the present invention, the connection of the longitudinal guidance system to the navigation system is configured in such a way that the system behavior as a whole is more transparent and plausible for the driver.

According to the present invention, this is achieved in that the limiting device is designed to deactivate automatically when changing from free driving mode to following driving mode and activate automatically when changing from following driving mode to free driving mode.

This mode of functioning is based on the consideration that the host vehicle in following driving mode is able to drive along the section of roadway ahead at the same speed at which the target object also drives along the same section of roadway. Deactivating the limiting device then has the advantage that the distance from the target object is kept constant and unnecessary deceleration and acceleration events that are contrary to the driver's intuition and increase fuel consumption are avoided. Experience shows namely that in following driving mode, the driver primarily bases his evaluation of his own speed on the distance from the vehicle ahead and experiences fluctuations of this distance for which he finds no plausible explanation to be unsettling. For that reason, the acceptance of the system may be significantly increased if the limiting device is active only in free driving mode.

Since it is only possible to determine the roadway curvature with limited precision using the route information supplied by the navigation system, it is expedient to program the limiting device in such a way that it considers a specific safety allowance in calculating the limiting value for the setpoint speed. Since the limiting device is active only in free driving mode, this safety allowance has no effect in following driving mode in which it would likely be experienced as unsettling.

If the target object is lost, for example when the preceding vehicle turns off or changes to an adjacent lane, the system goes into free driving mode and the limiting device activates automatically so that travel continues at an adapted speed.

According to an advantageous refinement of the present invention, there are specific exceptions to the rule that the limiting device should only be active in free driving mode. In particular, the limiting device should, by way of exception, also be active in following driving mode when there are definite indications that the expected route of the host vehicle deviates from the route of the target object and the speed adapted to the route of the host vehicle is significantly lower than the expected speed of the target object. A typical example is the situation in which the host vehicle approaches an intersection or bifurcation and the driver announces an intention to turn off by setting his turn signals (blinkers) while the target object travels straight ahead. A more general criterion for exception exists when it is apparent that the route of the host vehicle differs from the route of the target object and the speed at which the route of the target object may be traveled is higher by a specific threshold value than the speed at which it is possible to travel on the route of the host vehicle. The speeds at which the different routes may be traveled may be determined using the data supplied by the navigation system, in particular using the particular roadway curvatures.

If the route guidance function of the navigation system is activated, the assumption that the driver of the host vehicle will follow the route calculated by the route guidance function makes it possible to predict the route of the host vehicle.

If there is a plurality of possible routes for the host vehicle, for example ahead of an intersection or bifurcation, the limiting device preferably operates in free driving mode so that it calculates a limiting value for the setpoint speed for each possible route and selects the highest of these limiting values for limiting the setpoint speed.

In this way, the limiting device is constantly in a defined state even if the expected route is unclear, and therefore may be active even if no information is present concerning the route the driver is expected to select. When approaching an intersection or fork in the road, the mode of functioning of the limiting device is then based on the assumption that the driver will select from the various conceivable routes the one allowing the highest speed. It is not necessary for this assumption always to be accurate; however, it creates the precondition for the limiting device to be active in the first place when the route is unknown and thus makes it possible to adapt the speed automatically on sections of roadway on which the route is clear. In doing so, it is deliberately accepted that the driver must occasionally actively intervene in the longitudinal guidance, specifically when he selects from a plurality of possible routes the one that only permits traveling at a lower speed. In such situations, which occur only sporadically in any case, the driver must, however, assume that the limiting device is unable to accurately predict the adapted speed and he must therefore be prepared to actively intervene in the longitudinal guidance. The associated loss of comfort must simply be accepted. The advantage that the function of the limiting device is available in all other situations prevails.

DETAILED DESCRIPTION

Figure 1:
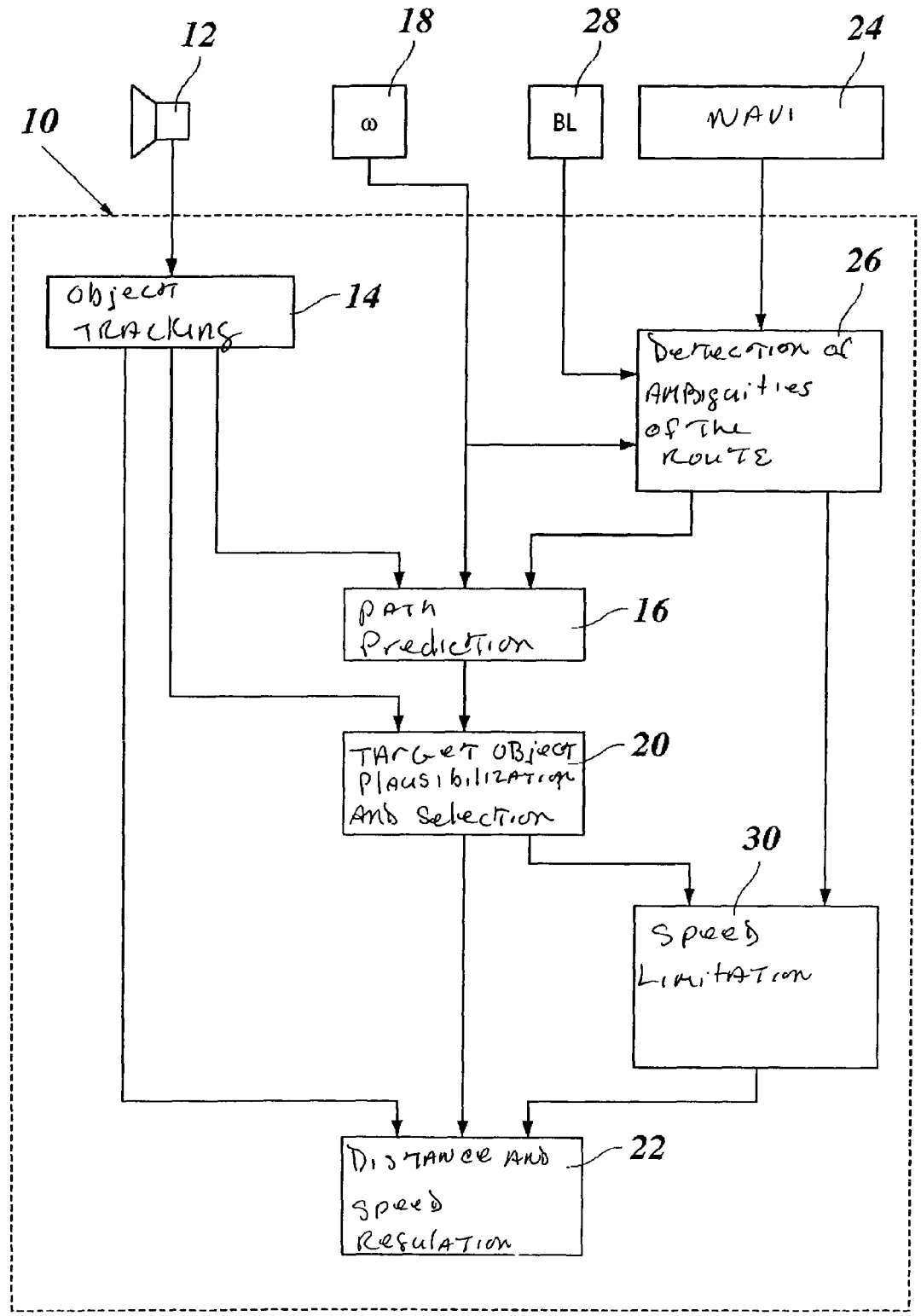
FIG. 1 shows a block diagram of the longitudinal guidance device.

FIG. 1 shows an ACC system 10, the basic design and function of which is presumed to be known and will therefore only be outlined briefly here.

A radar sensor 12 having angle resolution installed in the front of the vehicle supplies ACC system 10 with locating data (distances, relative speeds, and azimuth angles) of the objects located. The measured data are updated cyclically. In a tracking module 14, the prevailing measured data are compared with the measured data from previous measurement cycles, thus making it possible to track the movements of individual objects.

A path prediction module 16 is used to estimate the anticipated path of the host vehicle. Therefore, in the simplest case only yaw rate w of the host vehicle is analyzed, this yaw rate being measured with the help of a yaw rate sensor 18, a determination of road curvature in the section of road on which the host vehicle is driving at the moment being made possible in conjunction with the driving speed of the host vehicle.

On the basis of the predicted path, a driving tube, within which the vehicles that may be used as the target object for the adaptive cruise control must be situated, is determined. In the simplest case, this driving tube is a strip having a certain standard width following the predicted path.

A plausibility check is then performed on the objects located and tracked in tracking module 14 in a plausibility check module 20, i.e., a probability of an object being inside the driving tube is calculated for each object. This takes into account the fact that the locating data, in particular the transverse position data, have certain error tolerances that increase with an increase in object distance. If the probability that the object is within the driving tube is above a certain threshold, the object is "plausibilized," i.e., it is treated like a relevant object that is in one's own lane. Of the objects thereby plausibilized, ultimately the object having the smallest distance is then selected as the target object for the adaptive cruise control.

In a regulator 22, the actual adaptive cruise control is then performed on the basis of the locating data on the target object by intervening in the drive system and, if necessary, also intervening in the brake system of the vehicle, so that the target object is tracked with a time gap that is selectable by the driver within certain limits. If no target object is present, the system is in free driving mode and normally the speed is regulated based on a desired speed selected by the driver.

ACC system 10 described here has an interface to a navigation system 24 of the vehicle. This navigation system contains a road map stored in digital form and ascertains the instantaneous position of the host vehicle with the help of a GPS system (global positioning system), so that information about the road type (highway or rural road) and about exit ramps, intersections, junctions, curves and the like yet to come is also available in the ACC system.

In particular, the curvature of the section of roadway lying directly ahead may be determined from the data stored in the digital map. This information may be used on the one hand to improve the path prediction in prediction module 16. However, in free driving mode in particular, it may also be used to improve the longitudinal guidance of the vehicle. While applying a maximum transverse acceleration, which, depending on the vehicle type, is still experienced as comfortable, the roadway curvature may be used to calculate an upper limiting value for the speed at which the section of roadway in question should be traveled. If this limiting value is lower than the desired speed, it is expedient to modify the speed regulation so that it is based on the limiting value instead of the desired speed.

In addition, the data supplied by the navigation system may also be used to decide if the section of roadway ahead is a highway outside of built-up areas or a street within a city or town so that the applicable legal maximum speed may be selected as a limiting value for the road type in question. The same applies in cases in which an "intelligent" navigation system supplies information concerning speed limits that may exist.

However, if a plurality of possible routes is available ahead of an intersection, bifurcation, or fork in the road, which is also identifiable from the data of the navigation system, specific assumptions must be made concerning which route the driver is expected to follow so that the system shows defined behavior in every situation. For this reason, the device shown in FIG. 1 has a module 26 which detects such route ambiguities using the data of navigation system 24. In order to eliminate or at least limit such ambiguities, module 26 additionally receives signals from a state sensor 28 which indicates the present state of the turn signal (blinker) of the host vehicle. If, for example, a possibility for turning off to the right exists and the right blinker is set, it may be concluded from this that the driver intends to turn off to the right and consequently the route turning off to the right is significant for determining the limiting value for speed. If, however, neither the right nor the left blinker is set, the situation remains ambiguous since it is not clear if the driver actually intends to drive straight ahead or has only forgotten to set the blinker. It may be possible to eliminate the ambiguity by analyzing the driver's steering behavior. For this purpose, module 26 in the example shown also receives the signal of yaw rate sensor 18.

If the guidance function is active in navigation system 24, in order to eliminate the ambiguity, it may also be assumed that the driver will follow the route calculated by the guidance system. In the example shown here, however, the route calculated by the guidance system will not be considered. In another embodiment, the limiting device may also be programmed in such a way that it is only active in free driving mode when the expected route of the host vehicle is known, for example, when the guidance function is active.

If a target object is selected and followed in a following driving situation, it is a reasonable assumption for the purposes of the adaptive cruise control that the host vehicle will follow the path of the target object. This assumption is based on the path prediction in prediction module 16.

In free driving mode, the aforementioned speed limiting value is calculated in a limiting device 30 which receives from module 26 the roadway data of all possible routes still remaining after the most extensive elimination of ambiguity. In addition, limiting device 30 receives from plausibility check module 20 the information as to whether a target object has been selected or not. If a target object is selected, i.e., in following driving mode, limiting device 30 remains inactive and the adaptive cruise control based on the target object occurs in regulator 22 independently of the data supplied by navigation system 24.

In free driving mode, limiting device 30 calculates a separate limiting value for each of the possible routes, each based on the roadway curvature applicable to the route in question. Limiting device 30 then selects the highest of the limiting values calculated in this manner and compares it with the desired speed selected by the driver. The lower of the two values compared with one another is then transferred to regulator 22 as the setpoint speed.

Figure 2:
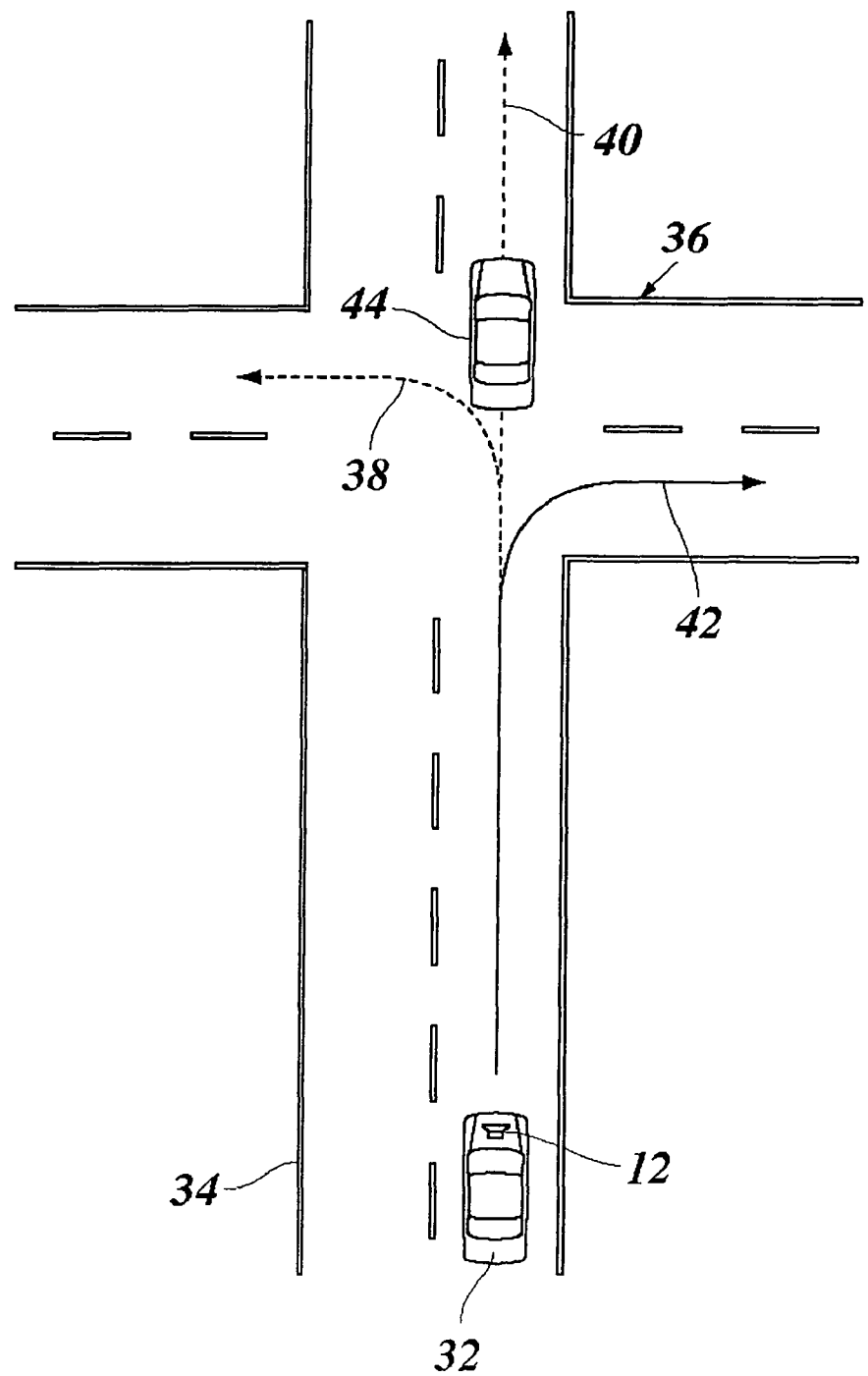
FIG. 2 shows a sketch of a traffic situation for illustrating the mode of operation of the device.

FIG. 2 illustrates the mode of operation of the device described above based on an example.

A vehicle 32 which is fitted with the device according to FIG. 1 approaches an intersection 36 on a right-of-way street 34. Vehicle 32 thus has three possible routes 38, 40 and 42 available to it, which differ in the curvature of the roadway. Routes 38 and 42 may only be traveled at a significantly lower speed than route 40.

ACC system 10 is in following driving mode and follows a preceding vehicle 44, which is just crossing intersection 36, as a target object. As long as nothing is known concerning the route of vehicle 32, the assumption is valid that the target object will continue to be followed. Regulator 22 thus regulates the speed of vehicle 32 in such a way that vehicle 44 is followed at a suitable time interval. Even if road 34 should have tight curves in its further course and vehicle 44 reduces its speed, regulator 22 would essentially keep the time interval between the target object and vehicle 32 constant, since limiting device 30 is not active.

In the situation shown in FIG. 2, module 26 now detects that the driver of vehicle 32 activates his right turn signal, from which it is concluded that vehicle 32 will follow route 42 and thus turn off to the right. Alternatively, this could also be detected from the fact that the guidance system of navigation system 24 has calculated route 42.

Module 26 now prompts prediction module 16 to correct the path prediction so that the target object is no longer in the predicted driving tube. Consequently plausibility check module 20 discards the target object so that the system shifts into free driving mode. Accordingly, limiting device 30 is activated so that the setpoint speed for regulator 22 is limited in such a way that the turning maneuver may be performed at an adapted speed. If the driver of vehicle 32 travels straight ahead contrary to expectation, the target object is detected again and the system returns to following driving mode and deactivates limiting device 30.

In a modified specific embodiment, the speed limiting values for the three possible routes 38, 40 and 42 have already been calculated before the situation shown in FIG. 2. Even before vehicle 44 has reached intersection 36, the system is able to detect that the speed of the target object is too high for routes 38 and 42 and from this it is able to conclude that the target object will follow route 40, i.e., will deviate from its own route 42. In this case, limiting device 30 may already be activated although the system temporarily remains in following driving mode. The limiting device does not then completely cancel the adaptive cruise control but instead only the setpoint speed is limited from increasing so that vehicle 32 is slowed down for the turning maneuver and also does not approach the target object too closely if this target object should decelerate its travel.

Figure 3:
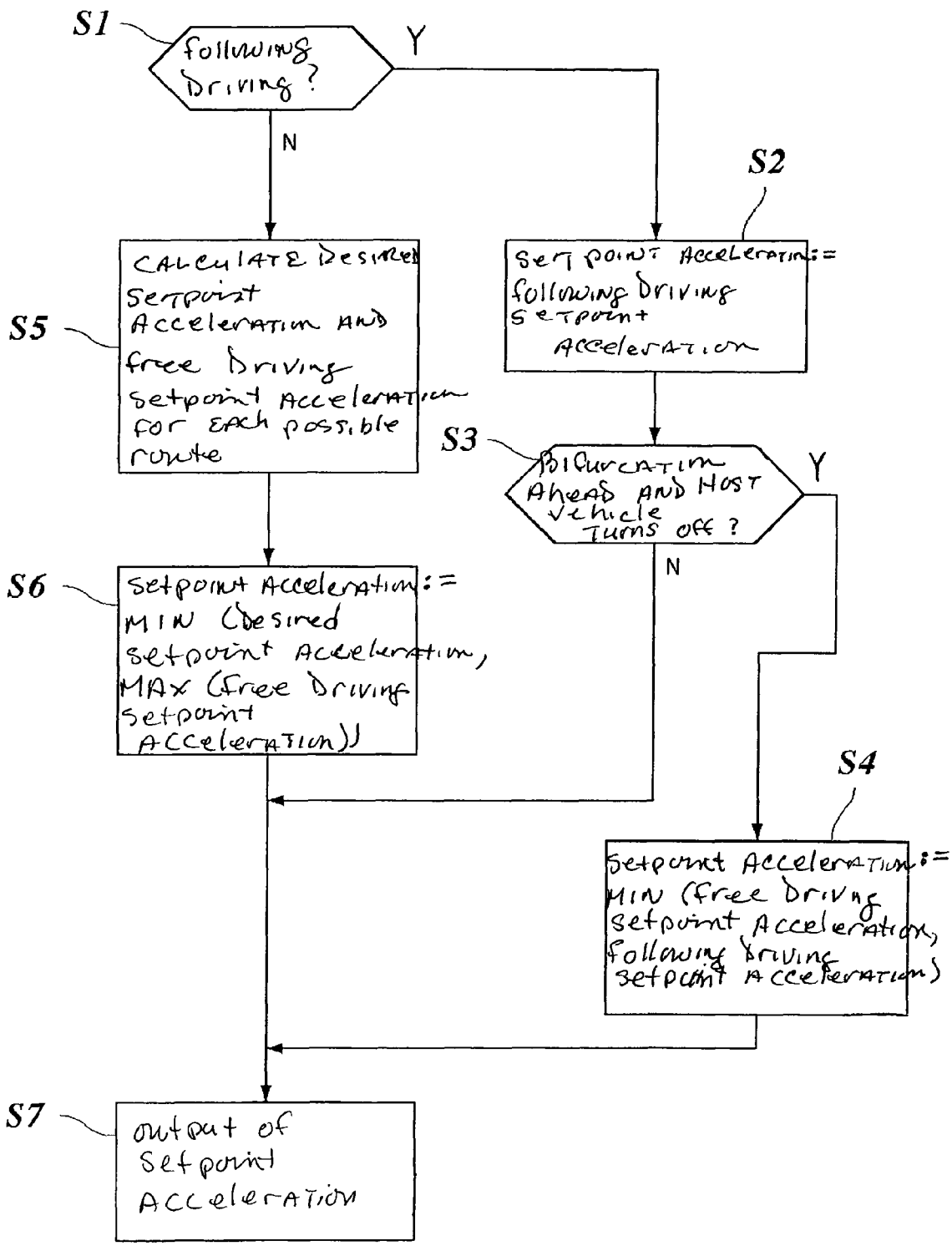
FIG. 3 shows a flow chart for elucidating the mode of operation of the device according to a modified embodiment

FIG. 3 shows a slightly modified mode of functioning of the device in a flow chart which, however, is in result equivalent to the mode of functioning described above.

In step S1 it is decided if ACC system 10 is in following driving mode (Y) or in free driving mode (N). If the system is in following driving mode, regulator 22 calculates a following driving setpoint acceleration as a setpoint acceleration in step S2 using the data concerning the target object supplied by tracking module 14, the following driving setpoint acceleration ensuring that the target object is followed at the specified time interval.

In step S3, module 26 then checks while still in following driving mode if a bifurcation or intersection 36 is present in the area ahead of vehicle 32 or if vehicle 32 will turn off. If this is the case, a free driving setpoint acceleration is calculated in step S4 which decelerates the vehicle in such a way that its speed is at most equal to the calculated limiting value during the turning maneuver. The minimum from the thus calculated free driving setpoint acceleration and the following driving setpoint acceleration from step S2 is then selected as a final setpoint acceleration.

In free driving mode, however, in step S5, limiting device 30 calculates a desired setpoint acceleration as well as free driving setpoint accelerations for each of the possible routes. The desired setpoint acceleration is the acceleration necessary to maintain or reattain the desired speed selected by the driver. The free driving setpoint accelerations are dependent on the roadway curvature and/or other roadway characteristics of the route in question. In calculating them, limiting device 30 uses roadway data supplied by navigation system 24 for the routes considered possible by module 26. In step S6, limiting device 30 then calculates as a setpoint acceleration the minimum from the desired setpoint acceleration and the maximum of the free driving setpoint accelerations.

In step S7, regulator 22 then outputs either the setpoint acceleration calculated in step S2 or S4 or the setpoint acceleration calculated in step S6 to the drive and/or brake system of the vehicle.

In contrast to the exemplary embodiment described earlier, this exemplary embodiment does not take into account the setpoint speed but instead the setpoint acceleration. However, in this case also, the free driving setpoint accelerations are calculated in steps S4 and S5 in such a way that a limiting value for speed is first determined for each route using the roadway curvature, and the setpoint acceleration is then calculated in such a way that the actual speed on reaching the section of roadway in question corresponds to the limiting value. The limiting values are thus contained implicitly in the free driving setpoint accelerations and the setpoint accelerations calculated in steps S4 and S6 imply a limiting of the setpoint speed.

What is claimed is:

1. A device for longitudinally guiding a motor vehicle, comprising:
   a sensor system for locating preceding vehicles;
   a regulator that regulates a speed of the vehicle to a setpoint speed, in a free driving mode or in a following driving mode, the setpoint speed depending on a distance from a preceding vehicle;
   an interface to a navigation system that provides information concerning a route traveled; and
   a limiting device for limiting the setpoint speed based on the information provided, wherein the limiting device deactivates automatically when changing from free driving mode to following driving mode and activates automatically when changing from following driving mode to free driving mode.

2. The device according to claim 1, further comprising a module to detect that a plurality of possible routes are available in following driving mode based on data of the navigation system, and wherein the device is further designed to detect a situation in which a route expected to be followed by the preceding vehicle deviates from a route expected to be followed by a host vehicle and the route of the host vehicle allows only a significantly lower speed than the route of the preceding vehicle and to activate the limiting device in this situation.

3. The device according to claim 2, wherein the module detects an approach of the host vehicle to a bifurcation or intersection using the data of the navigation system and then detects an intention of a driver of the host vehicle to turn off using additional information.

4. The device according to claim 3, wherein one of the pieces of additional information is a signal of a state sensor which indicates a state of a turn signal of the vehicle.

5. The device according to claim 3, wherein one of the pieces of additional information is guidance information of the navigation system concerning a calculated route.

6. The device according to claim 1, wherein the limiting device calculates a limiting value for the setpoint speed when route ambiguity is detected for each possible route in free driving mode and to select the highest of these limiting values for limiting the setpoint speed.

7. The device according to claim 6, wherein the limiting values for the setpoint speed depend on the information provided by the navigation system concerning a roadway curvature on a route in question.

* * * * *